No. 844,270. PATENTED FEB. 12, 1907.
G. EMERY.
AIR BRAKE ATTACHMENT.
APPLICATION FILED APR. 7, 1906.
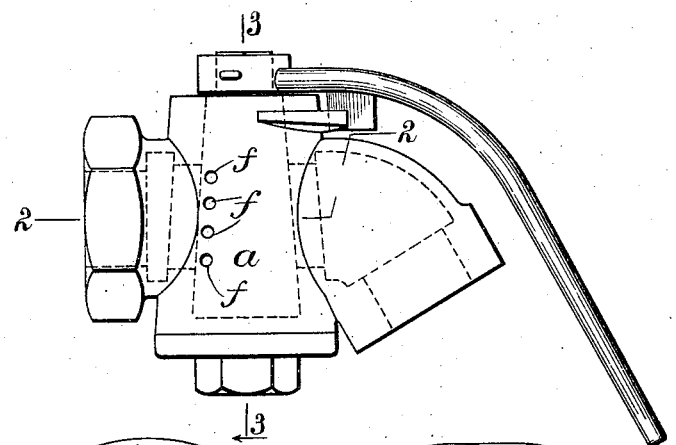
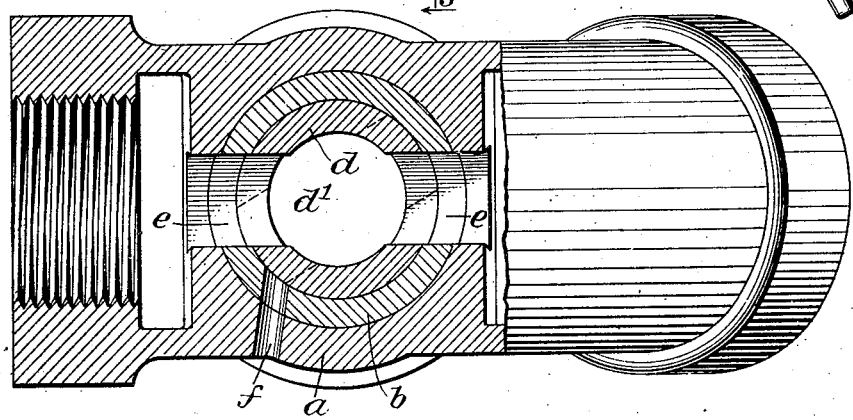
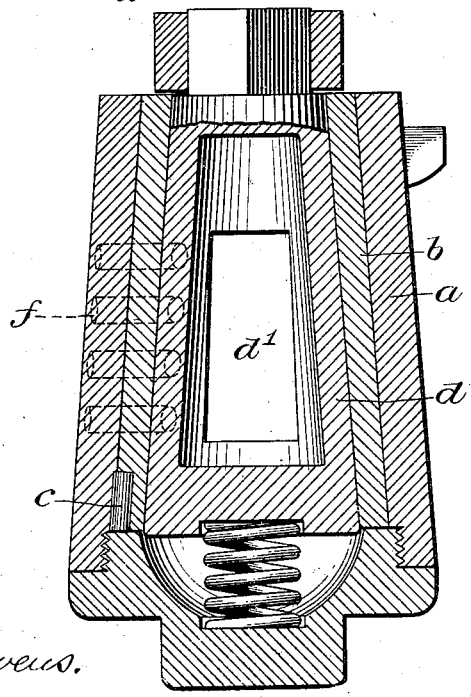
WITNESSES
INVENTOR
George Emery
BY
ATTORNEYS

UNITED STATES PATENT OFFICE.

GEORGE EMERY, OF ARGENTA, ARKANSAS.

AIR-BRAKE ATTACHMENT.

No. 844,270.  Specification of Letters Patent.  Patented Feb. 12, 1907.

Application filed April 7, 1906. Serial No. 310,444.

*To all whom it may concern:*

Be it known that I, GEORGE EMERY, a citizen of the United States, and a resident of Argenta, in the county of Pulaski and State of Arkansas, have invented a new and Improved Air-Brake Attachment, of which the following is a full, clear, and exact description.

The object of this invention is primarily to so construct the usual angle-cocks applied to the train-lines in air-brake systems that should the cock be accidentally, maliciously, or otherwise closed during the operation of the train the engineer will be instantly informed, thus avoiding the possibility of the engineer running the train in ignorance of the fact that a part thereof is cut off from the brake control.

A further object of the invention is to improve the construction of the angle-cock so as to avoid the bushing usually fitted thereto from working loose and destroying the operation of the device.

I attain these ends by providing the shell or casing of the valve with one or more vents to the atmosphere, which come into operation the instant that the valve is turned toward closed position, the result being that as the valve is started toward its closed position the train-line is vented sufficiently to cause a movement of the triple valves of the train to braking position, thus notifying the engineer unmistakably and instantly that the angle-cocks are being tampered with. I also provide the bushing with a peculiarly-arranged key or lock pin which fastens the bushing securely in the shell or casing of the device and prevents the possibility of the bushing becoming loose.

The invention involves various other features of major or minor importance, and all will be fully set forth hereinafter and particularly set forth in the claims.

Reference is to be had to the accompanying drawings, which illustrate as an example the preferred embodiment of my invention, in which drawings—

Figure 1 is a side view of an angle-cock embodying my invention. Fig. 2 is an enlarged section of the invention on the line 2 2 of Fig. 1, and Fig. 3 is an enlarged section of the invention on the line 3 3 of Fig. 1.

$a$ indicates the shell of the valve, in which the usual bushing $b$ is fitted. In order securely to hold the bushing in place, I form in the meeting surfaces of the shell and bushing a suitable groove or passage, and in this passage I secure a lock-pin $c$, which effects a positive mechanical connection between the two parts and prevents any independent movement of the bushing.

$d$ indicates the plug of the valve, which has the usual passage $d'$ extending transversely through it, and which is arranged to register with ports $e$, thus opening the valve, as will be understood from the prior art. The shell or casing of the valve and the bushing $b$ therein are formed with a number of vents $f$, which are preferably four in number, as the drawings show, but which may be increased or diminished at will. These vents pass from the interior of the bushing outward to the atmosphere. With this construction the instant that the valve is turned toward closed position, as indicated by the broken lines in Fig. 2, the passage $d'$ of the plug $d$ communicates not only with the ports $e$ of the valve, but also with the vents $f$, with the result that sufficient of the train-line pressure is exhausted into the atmosphere to cause a movement of the triple valves, bringing about an application of the brakes. In this manner the engineer is notified promptly and certainly that the positions of one or more of the angle-cocks have been changed or that the brake system has become in some other way disarranged. The improvement avoids the possibility of instantly closing of the cocks, which would cut off part of the train from brake control and involve the danger of the engineer running the train in this way until confronted with an emergency, where it would be found that the train was not under control and where it would be too late to correct the fault.

Having thus described the preferred form of my invention, what I actually claim, and desire to secure by Letters Patent, is—

1. An angle-cock for air-brake systems having a shell or casing provided with ports, and a plug mounted to turn in said casing and having a passage adapted to register with said ports, the said casing being provided with a plurality of vents leading to the atmosphere, the vents opening into the interior of the casing close to one of said ports, whereby when the plug is started toward closed position the vents are immediately uncovered for the purpose set forth.

2. An angle-cock having a shell or casing, a bushing fitted therein, the shell or casing and bushing being provided with registering ports and having a vent extending from the interior of the bushing at a point close to one of said ports and passing through the shell or casing, and a plug operating in said bushing and having a passage adapted to communicate with the vent as soon as the plug is started toward closed position.

3. An angle-cock having a shell or casing, a bushing fitted therein, the said bushing and casing being provided with registering grooves in their meeting surfaces, a lock-pin fitting in said grooves to lock the bushing in place, and a plug operating in the bushing.

4. An angle-cock having a shell or casing, a bushing fitted therein, the said bushing and casing being provided at one end with registering grooves in their meeting surfaces, a lock-pin fitting in said grooves, means for holding the pin in position, and a plug operating in the bushing.

5. An angle-cock having a shell or casing, a bushing fitted therein, the casing and bushing having registering openings forming ports and a plurality of registering openings forming vents, the vent-openings being in alinement with each other and the inner ends of said openings being located close to one of said ports, means for locking the bushing in place in the casing, and a plug operating in the bushing and having a transverse passage to register with the said ports, the said plug opening the vents in the bushing and casing as soon as the plug is started toward closed position.

In testimony whereof I have signed my name to this specification in the presence of two subscribing witnesses.

GEORGE EMERY.

Witnesses:
   JAMES W. MCKINNEY,
   SAMUEL R. CHEW.